Nov. 7, 1950 — G. F. FELTON — 2,529,285
DEVICE FOR HOLDING OBJECTS
Filed May 20, 1948
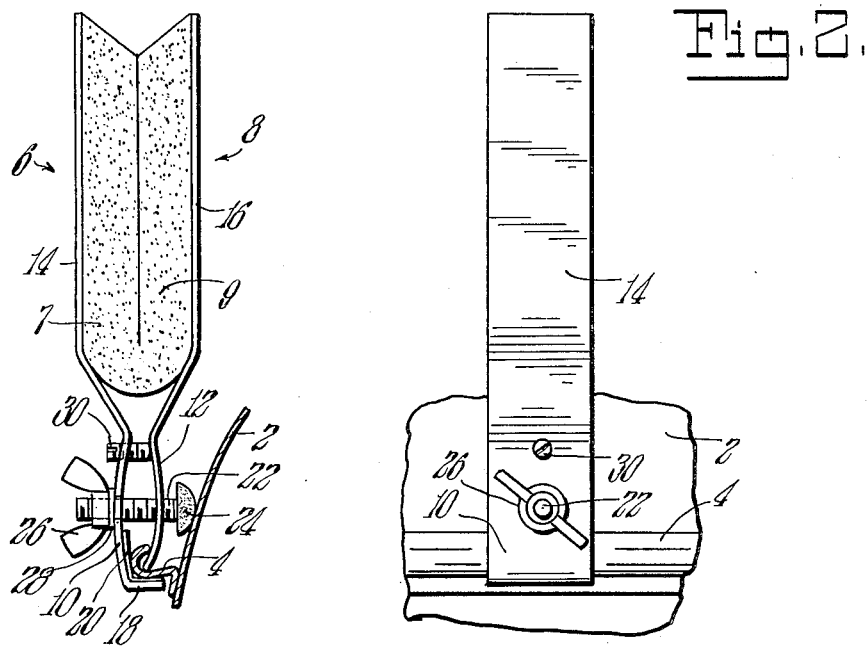
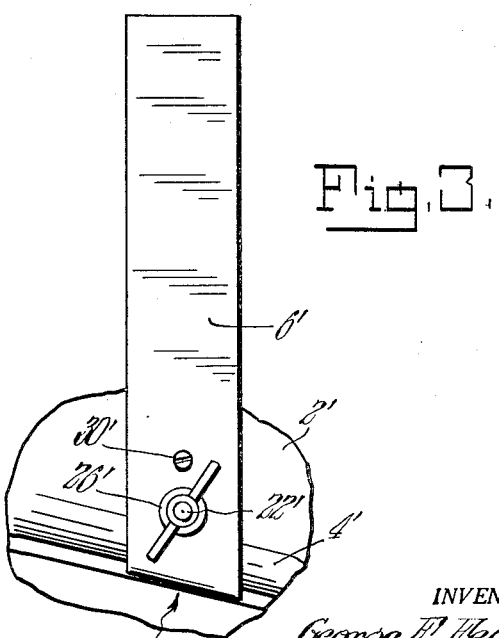
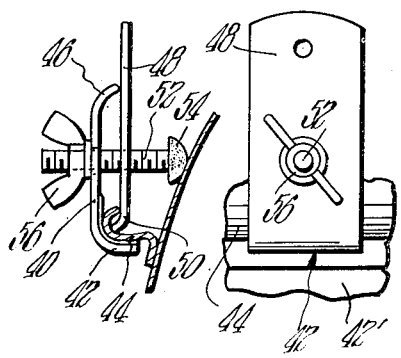
INVENTOR.
George F. Felton
BY Ross & Ross
Attys.

Patented Nov. 7, 1950

2,529,285

UNITED STATES PATENT OFFICE 2,529,285

DEVICE FOR HOLDING OBJECTS

George F. Felton, Millers Falls, Mass.

Application May 20, 1948, Serial No. 28,190

1 Claim. (Cl. 248—229)

This invention relates to improvements in clamping devices and is more particularly directed to the provision of a novel device for clamping a fishing rod or the like in such a way that the same is safely supported for carrying, storage, or other purposes.

It is a principal object of the invention to provide a device which is capable of being removably attached to such a movable object as an auto body. As special features, the device includes a pair of relatively movable arms which preferably are cushioned and between which the fishing rod is held.

A further object of the invention is the provision of a simple yet efficient clamping device which is easy and economical to manufacture. As will appear, the various parts are capable of ready assembly and the clamping action is easily adjustable.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

Fig. 1 is a side elevational view of a holder embodying the novel features of the invention;

Fig. 2 is a front elevational view of the holder shown in Fig. 1;

Fig. 3 is a view similar to that of Fig. 2 showing a modified form of the invention; and Figs. 4 and 5 are side and front elevational views of another modified form of the invention.

Referring now to the drawings more in detail, the invention will be fully described.

To explain the invention, a section of the top of an automobile at the side thereof is represented by 2 in Figs. 1 and 2 and by 2' in Fig. 3. A gutter or eaves trough 4 extends along the sides of the top as shown in Figs. 1 and 2 inclines downwardly at the rear end of the vehicle as indicated by 4' in Fig. 3.

The gutter is usually semi-circular in its cross section as illustrated in Figs. 1 and 3.

The device of the invention includes inner and outer clamp members 6 and 8 respectively which have lower portions 10 and 12 respectively which are disposed inwardly of the planes of upper portions 14 and 16 respectively.

The lower portion 10 is provided with an inwardly extending lip 18 which is adapted to underlie the gutter 4 and it may have on its inner side a protecting strip 20 of yieldable material such as fabric, or the like.

The portion 12 of member 8 is arranged to engage the inner side of gutter 4.

A screw 22 is in threaded engagement with portion 12 of member 8 and it has an inner end 24 which may be made from a yieldable material such as felt, rubber or the like.

The outer end of screw 22 extends loosely through an opening in member 10 and a wing nut 26 threadedly engages the screw 22 and a spring washer 28 may be disposed upon the screw 22 between the nut 26 and the member 10.

An adjusting screw 30 is in threaded engagement with the member 10 and its inner end is adapted to abut member 12.

A strip of resilient or yieldable material is doubled upon itself and has opposite ends secured in any suitable manner, as by adhesive, to inner faces of members 6 and 8 forming pads 7 and 9 so that an object such as a fish pole may be inserted therebetween and yieldingly gripped by the pads 7 and 9. The material may include rubber, felt, sponge rubber or the like.

In securing the device to an automobile the part 18 of member 6 is located below the gutter 4 and the lowermost end of member 8 is disposed rearwardly of the gutter 4.

The wing nut is run onto screw 22 so that the gutter is gripped by the parts 10 and 12. The screw 30 is adjusted in such a manner that the desired clamping action may be obtained.

The screw 22 is adjusted so that pad 24 thereof abuts the roof and this adjustment may be such as to brace the device and determine its vertical position.

With the device secured to a gutter as described, a fish pole or the like may be inserted therein.

There may be as many devices secured to a gutter as may be desired and obviously they may be in more or less alignment for cooperating to support a single object.

In Fig. 3, the gutter 4' is shown at an angle and the lower ends of the members are inclined as at 32 whereby the device may be clamped to the gutter and be disposed in a vertical position. This form of the device is provided with screw 22', wing nut 26', and screw 30' and functions similarly to the form shown in Figs. 1 and 2.

In Figs. 4 and 5 an outer member 40 has a lower lip 42 for disposition below gutter 44 and an upper lip 46.

An inner member 48 has a lower end portion 50 for engaging the inner side of the gutter 44. A screw 52 in threaded engagement with the member 48 has a pad similar to pad 24 and loosely extends in a hole provided in member 40. A wing nut 56 on the screw 52 is adapted to bear against member 40.

The lip 42 is arranged to underlie the gutter and the lower portion of member 48 is disposed against the inner side of said gutter. The wing nut is tightened and with the upper portion 46 of the outer member bearing on member 48 the device securely engages the gutter. The screw 52 is adjusted relative to member 48 so that its pad 54 may abut the top 42'.

The members 6 and 8 may be made from a yieldable or spring-like material so that in conjunction with pads, an object such as a fishing rod may be yieldably engaged between the pads.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A holder device for securement to an elongated gutter which is open along its upper side adjacent a portion of an automobile top which curves upwardly and inwardly relative to said gutter comprising, elongated outer and inner clamp members having lower clamp and upper portions, the lower clamp portion of said inner member adapted for disposition inside said gutter, the lower clamp portion of said outer member having an extremity turned inwardly relative to the other member for underlying said gutter, a screw in threaded engagement with the lower portion of the inner member adapted to abut the automobile top adjacent said gutter, the lower clamp portion of the outer member having a hole through which said screw extends, a nut on said screw outside the clamp portion of the outer member for acting thereon to draw the clamp portions together, a screw in threaded engagement with the clamp portion of one member and in abutment with the clamp portion of the other member to limit movement of said clamp portions towards one another, the said upper portions of the clamp members diverging outwardly and upwardly into spaced parallel relation and having yieldable material secured to inner portions thereof.

GEORGE F. FELTON.

REFERENCES CITED

The following references are of record in the file of this patent:

UNITED STATES PATENTS

| Number | Name | Date |
|---|---|---|
| 624,845 | Mosher | May 9, 1899 |
| 2,263,554 | Brach | Nov. 25, 1941 |
| 2,288,442 | Felton | June 30, 1942 |
| 2,461,897 | Hopkins | Feb. 15, 1949 |